Jan. 9, 1951 H. J. MORAN 2,537,152
PARACHUTE ASSEMBLY
Filed Jan. 15, 1948 2 Sheets-Sheet 1
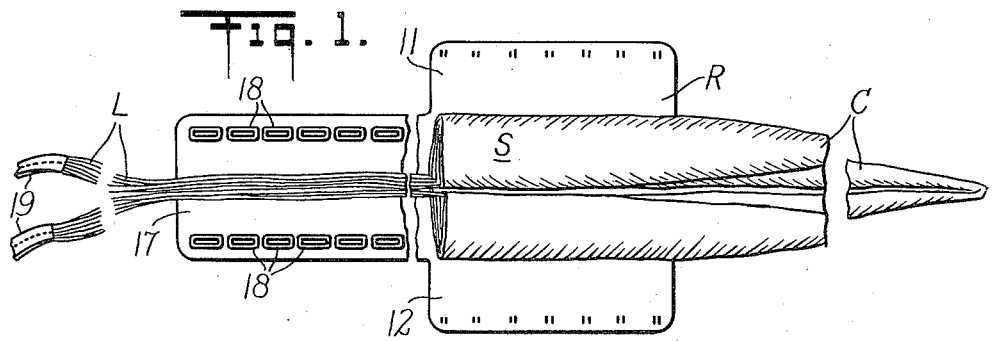
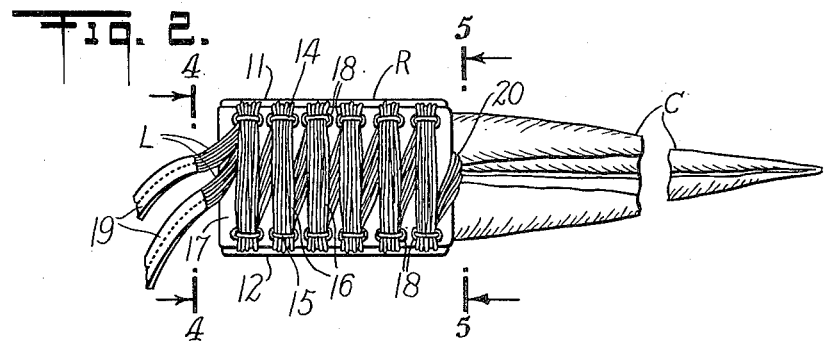
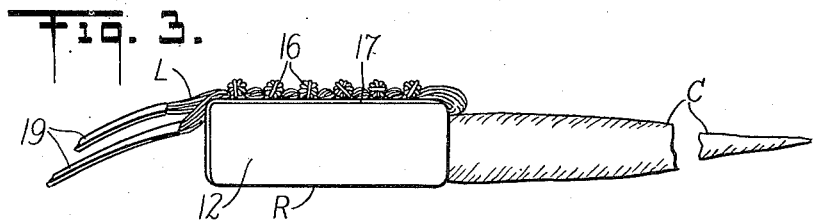
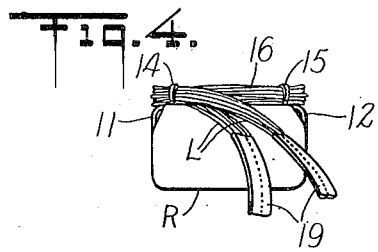
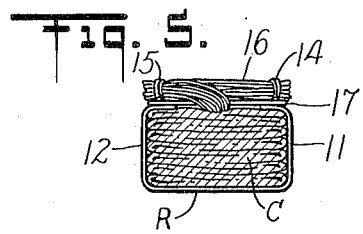
INVENTOR
Harold J. Moran
BY
Blair, Curtis & Hayward
ATTORNEYS

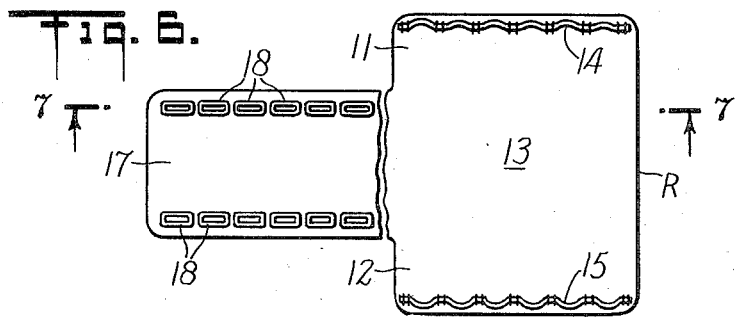
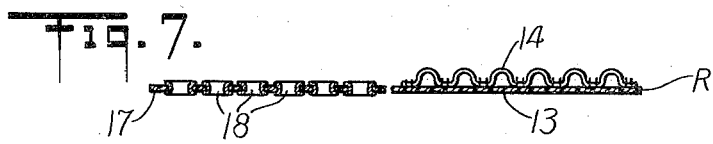
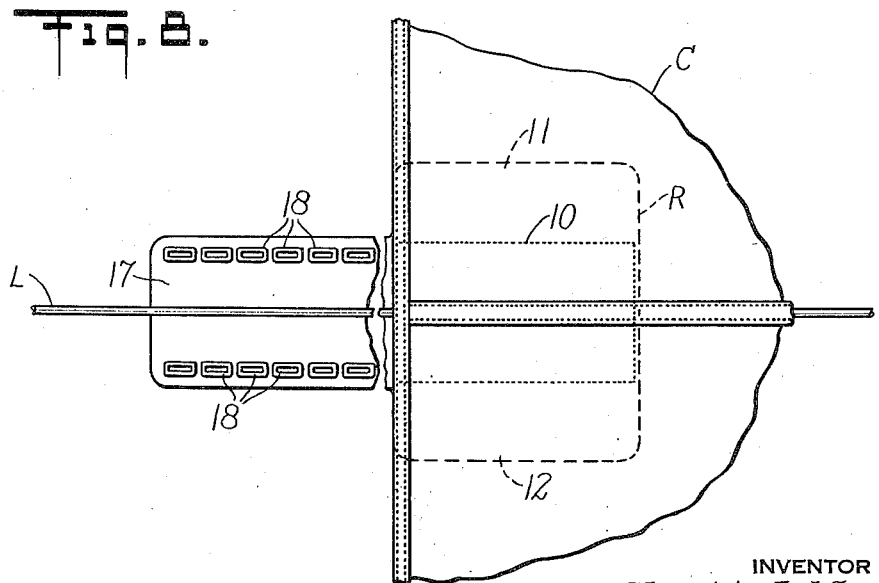
INVENTOR
Harold J. Moran
BY
Blair, Curtis & Hayward
ATTORNEYS Patented Jan. 9, 1951

2,537,152

UNITED STATES PATENT OFFICE 2,537,152

PARACHUTE ASSEMBLY

Harold J. Moran, Trenton, N. J., assignor to Switlik Parachute Company, Inc., Trenton, N. J., a corporation of New Jersey Application January 15, 1948, Serial No. 2,479

9 Claims. (Cl. 244—148)

This invention relates to a parachute assembly.

An object of the invention resides in a parachute assembly which includes a canopy, suspension lines and a retainer for maintaining the skirt of a canopy in such folded condition that the canopy will not inflate until the suspension lines have payed out from the pack and are extended with the result that the lines will not become fouled and the canopy will not become burned by the lines.

A further object of the invention resides in the provision of such an assembly as above set forth in which the folded canopy skirt will be maintained folded until the entire bundle of suspension lines has become fully extended.

A still further object of the invention resides in the provision of such an assembly as above set forth in which the suspension lines act to maintain the skirt of the canopy in folded condition.

Another object of the invention resides in the provision of a parachute assembly of the character above set forth which may be packed in the conventional types of pack covers.

With these and other objects, that will appear as the description progresses, my invention resides in the combination and arrangement of parts illustrated in the drawings, described in the specification and recited in the claims.

In the drawings, in which the best form of my invention now known to me is illustrated:

Figure 1 is a plan view, partly broken away, showing the relationship of the retainer and the canopy after the latter has been folded but while the retainer still remains in an extended or unfolded condition.

Figure 2 is a similar view showing the relationship of the retainer, the canopy and the suspension lines after the device has been completely packed.

Figure 3 is a side elevation looking at the device in the condition illustrated in Figure 2.

Figure 4 is an end elevation looking in the direction of the arrows indicated at line 4—4 on Figure 2.

Figure 5 is a sectional view on line 5—5 of Figure 2, looking in the direction of the arrows.

Figure 6 is a plan view of the retainer before it has been applied to the canopy and while it is in an unfolded condition.

Figure 7 is a sectional view on line 7—7 of Figure 6 and

Figure 8 is a fragmentary plan view showing the manner in which the retainer is secured to the canopy skirt, part of the canopy skirt being shown broken away.

In the drawings the conventional parachute canopy is indicated by the reference character C and its suspension lines by the character L.

This canopy may be of any conventional or desirable form with the suspension lines secured thereto and extending from the skirt S thereof.

To the outside of the canopy C a retainer R is attached as, for example, by stitching 10. The retainer R includes free flaps 11 and 12, which may be attached, integrally or otherwise, to a body portion 13.

The flaps are of such width and are so spaced apart that they will embrace and enclose the skirt of the canopy C when the latter is folded in the usual manner with the folds in superimposed relation.

Each of the flaps 11 and 12 is provided with a plurality of loops 14 and 15 for the reception of the suspension line loops 16 when lines are grouped in a rope-like bundle in the usual manner.

The retainer R includes, also, a flap 17 which extends from the skirt S of the canopy C and may be integral with or attached to the body portion of the retainer R.

The opposite edges of this flap 17 are provided with eyelets 18 of such size that the loops 16 may extend therethrough when the flaps 11 and 12 are folded over the folded skirt and the flap 17 is folded over the flaps 11 and 12.

When the elements of the assembly are in their packed condition for placement in a pack cover, the skirt of the canopy will have been folded into the condition shown in Figure 1 of the drawings from its extended condition, such as illustrated in a fragmentary way, in Figure 8 of the drawings. The flaps 11 and 12 will overlie the folded portion of the skirt of the canopy with the loops 14 and 15 exposed. The flap 17 will be folded over the flaps 11 and 12 and the loops 14 will extend through the eyelets or grommets 18 in the flap 17. The bundles 16 of the suspension lines L will be woven back and forth transversely the flap 17 and will be engaged through the loops 14 and 15 which may be made of tape or elastic or of any material which will release the bundles of suspension lines when force is applied thereto to the lift webs 19.

In packing the suspension lines, after they have been grouped they are drawn out around the edge of the flap 17 at 20 and thence woven back and forth against the flap and engaged by the loops 14 and 15.

When the elements of the device are thus assembled the folded canopy may be folded back and forth over the top of the suspension lines and longitudinally of the flap 17. In this condition the entire device may be placed within and secured within the usual or any desirable parachute pack retainer.

When the device is released from the retainer by the operation of a rip cord or static line the pull on the suspension webs 19 will progressively pull the bundle 16 of the suspension line from the loops 14 and 15 until the entire length of suspension lines that are engaged by the loops are released. Until they are released entirely from the loops, that is, until they are released from the last pair of loops, the flap 17 and the flaps 11 and 12 will be securely maintained in position enveloping the folded over skirt of the canopy and thus the skirt will not be permitted to inflate until all of the suspension lines are extended. When the last loop 16 of the extension line is released the flaps 11, 12 and 17 are free to open and when opened will permit the skirt of the canopy to unfold and the canopy to inflate. But at this time the suspension lines will be fully extended and therefore the likelihood of their becoming fouled and burning the canopy will be overcome.

While I have illustratively described a particular embodiment of my invention it is to be understood that any details of construction may be changed without exceeding the scope of the claims or the spirit of the invention and therefore I do not wish to be limited to the precise form of the invention that I have disclosed for illustrative purposes.

What I claim is:

1. The combination with a parachute canopy having suspension lines attached to the skirt thereof, of a retainer permanently attached to the canopy on its skirt for storing and retaining said suspension lines in a bundle adajacent said skirt, and common means cooperating with said retainer and with said suspension lines to maintain the retainer releasably in closed position and for releasably maintaining said bundle of suspension lines on said retainer the opening of said retainer being under the control of said suspension lines.

2. The combination with a parachute canopy and its suspension lines of a pair of flaps secured to the outside of said canopy adjacent the skirt thereof and adjacent each other so that the skirt of said canopy may be folded to lie between said flaps and said flaps may be folded over said folded canopy skirt, an additional flap secured to said skirt and extending from the edge thereof and adapted to be folded over said first mentioned flaps, complemental separable fastener elements on said first mentioned flaps and said additional flap, and adapted to receive said suspension lines when the latter are grouped together in a rope-like bundle and to retain said lines in such form and said lines cooperating with said fastener elements to retain said first mentioned flaps and said additional flaps in their said folded condition, said flaps, fasteners, canopy, skirt and suspension lines being constructed and arranged so that when a pull is exerted on said group of suspension lines they will be released from their said retained position before the release of said flaps and said flaps will thereafter be released.

3. The combination with a parachute canopy of a retainer attached to the canopy on its skirt for storing said canopy in folded condition, a bundle of suspension lines attached to the skirt of the canopy arranged upon said retainer, and fasteners releasably engaging said bundle of suspension lines and releasably attached to said retainer to maintain said folded canopy within the same.

4. In a parachute pack, a folded parachute canopy, a retainer permanently secured to the canopy on its skirt, surrounding said folded canopy and being capable of opening, a bundle of suspension lines attached to the skirt of said canopy and arranged on said retainer, and common means for releasably holding said bundle of suspension lines on said retainer and for releasably holding said retainer in closed condition.

5. In a parachute pack, a folded parachute canopy, a retainer permanently secured to the canopy on its skirt, surrounding said folded canopy and being capable of opening, a bundle of suspension lines attached to the skirt of said canopy and arranged in zigzag relation on said retainer, and common means for releasably holding said bundle of suspension lines on said retainer and for releasably holding said retainer in closed condition.

6. In a parachute pack, a canopy having a body portion secured thereon at its skirt and a pair of flaps extending from said body portion and arranged on said canopy inwardly of the edge of its skirt, and an additional flap extending from said body portion outwardly from the edge of said skirt, said canopy being constructed and arranged to be folded on to said body portion and said flaps to be folded over the folded canopy and in overlapping relation to each other, and means for releasably securing said flaps together.

7. In a parachute pack, a canopy having a body portion secured thereon at its skirt and a pair of flaps extending from said body portion and arranged on said canopy inwardly of the edge of its skirt, and an additional flap extending from said body portion outwardly from the edge of said skirt, said canopy being constructed and arranged to be folded on to said body portion and said flaps to be folded over the folded canopy and in overlapping relation to each other, and means for releasably securing said flaps together, said means including a plurality of extensible loops carried by the first mentioned pair of flaps and openings through which said loops may extend carried by the last mentioned flap, and a bundle of suspension lines attached to said canopy skirt and arranged on said last mentioned flap and engageable with said extensible loops.

8. In a parachute pack, a folded canopy, a retainer secured to the canopy on its skirt and having a body portion and releasable flaps surrounding said folded canopy, a bundle of suspension lines attached to the skirt of said canopy and arranged on said retainer, and means including said suspension lines for releasably holding said retainer in closed condition.

9. In a parachute pack, a folded canopy, a retainer secured to the canopy on its skirt and having a body portion and releasable flaps surrounding said folded canopy, a bundle of suspension lines attached to the skirt of said canopy and arranged on said retainer, and means including said suspension lines for releasably holding said retainer in closed condition, said means also including fasteners attached to the retainer and releasably engaged with said bundle of suspension lines.

HAROLD J. MORAN.

REFERENCES CITED

The following references are of record in the file of this patent:

UNITED STATES PATENTS

| Number | Name | Date |
|---|---|---|
| 1,369,395 | Calthrop | Feb. 22, 1921 |
| 1,594,478 | Sperry | Aug. 3, 1926 |
| 2,046,387 | Knight | July 7, 1936 |
| 2,337,168 | Smith | Dec. 21, 1943 |
| 2,429,385 | Birdman | Oct. 12, 1947 |

FOREIGN PATENTS

| Number | Country | Date |
|---|---|---|
| 21,312 | Great Britain | of 1914 |